United States Patent [19]

Dombro et al.

[11] 4,246,137

[45] Jan. 20, 1981

[54] METHOD OF PREPARING ZIRCONIA-SILICA XEROGELS, THE XEROGELS, AND XEROGEL CATALYSTS

[75] Inventors: Robert A. Dombro; William Kirch, both of Clinton, Iowa

[73] Assignee: Chemplex Company, Rolling Meadows, Ill.

[21] Appl. No.: 44,004

[22] Filed: May 31, 1979

[51] Int. Cl.³ .................. B01J 27/02; B01J 27/24; B01J 29/00

[52] U.S. Cl. .................. 252/436; 252/438; 252/450

[58] Field of Search .................. 252/438, 436, 450

[56] References Cited

U.S. PATENT DOCUMENTS

| | | | |
|---|---|---|---|
| 2,289,919 | 7/1942 | Lee et al. | 252/250 |
| 2,444,913 | 7/1948 | Bond | 252/254 |
| 3,801,705 | 4/1974 | Krekeler et al. | 423/338 |
| 3,862,104 | 1/1975 | Witt | 252/458 |
| 3,950,316 | 4/1976 | Witt | 252/430 |
| 3,953,413 | 4/1976 | Hwang et al. | 252/431 R |
| 4,054,511 | 10/1977 | Miole et al. | 252/450 X |

Primary Examiner—Delbert E. Gantz
Assistant Examiner—William G. Wright
Attorney, Agent, or Firm—Wegner, Stellman, McCord, Wiles & Wood

[57] ABSTRACT

A method of preparing large pore volume zirconia-silica catalyst supports, the resulting supports and a method of polymerizing olefins comprising contacting an olefin or mixture of olefins with a catalyst prepared with these supports. The supports are prepared by reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH equal to at least 11, then adding an acidic solution to a pH of about 5–9 to produce a hydrocogel. The hydrocogel is then aged and washed free of soluble by-products first with water, then with aqueous ammonium nitrate and again with water. The water is removed from the washed hydrocogel by azeotropic distillation or by washing with a water miscible solvent and then calcining the resulting xerocogel.

12 Claims, 1 Drawing Figure

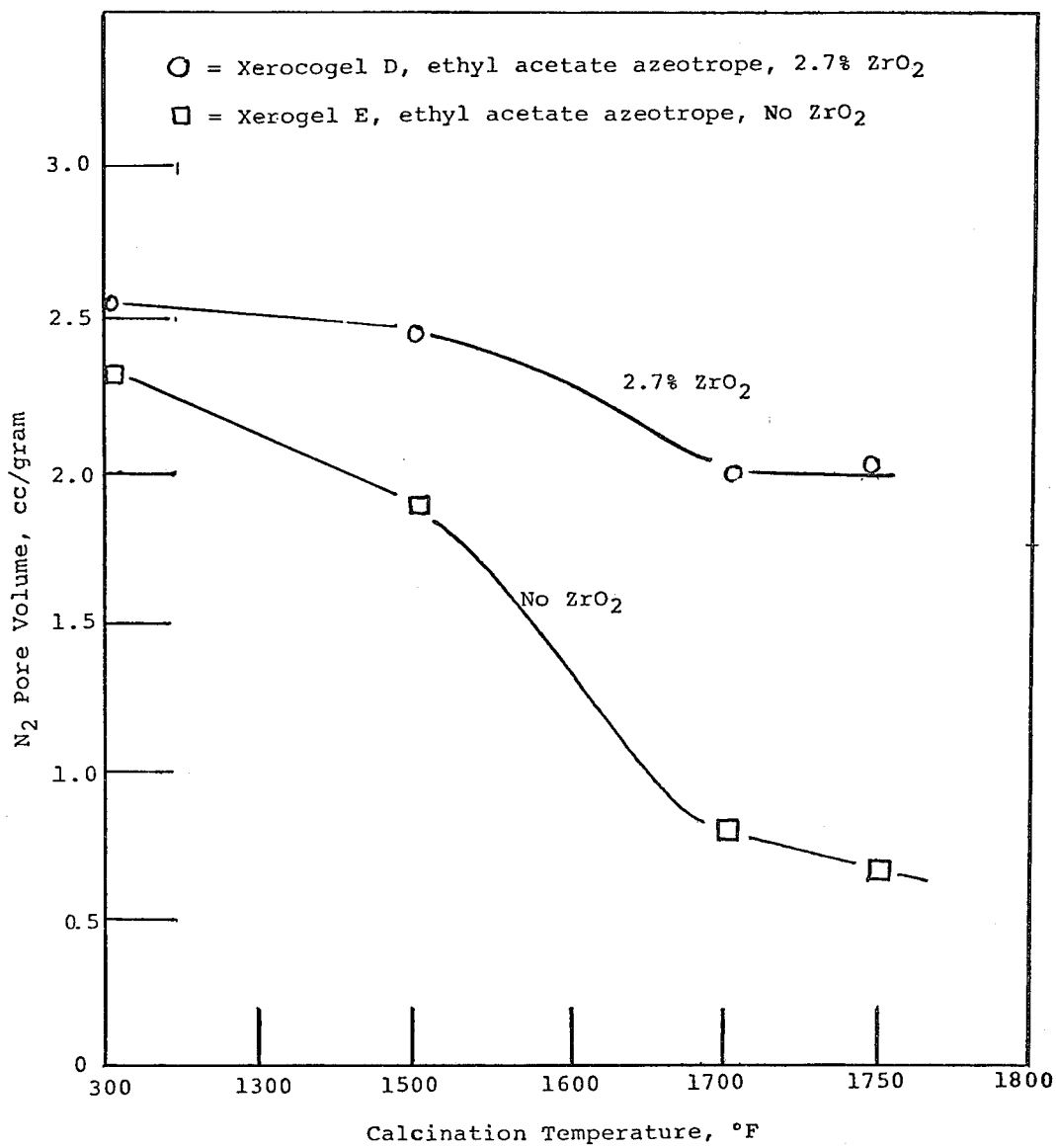

METHOD OF PREPARING ZIRCONIA-SILICA XEROGELS, THE XEROGELS, AND XEROGEL CATALYSTS

BACKGROUND OF THE INVENTION

One of the features of this invention is to prepare an improved large pore volume zirconia-silica catalyst support by reacting a particular zirconium compound with a particular silicate to produce a hydrocogel, aging the hydrocogel, washing with water and then aqueous ammonium nitrate and again with water, removing water from the resulting washed hydrocogel to produce a xerocogel either by azeotropic distillation or by leaching with a water miscible solvent and calcining the resulting xerocogel.

Another feature of the invention is to provide a catalyst support prepared by the above method.

A further feature of the invention is a method of polymerizing olefins comprising contacting the olefins with a catalyst comprising the above support and a chromium compound associated with it under polymerizing conditions.

The most pertinent prior art of which we are aware are the following:

U.S. Pat. No. 2,289,919 discloses purified silica hydrogel (free of sodium ion) suspended in a zirconium salt solution (aqueous zirconyl chloride). Aqueous ammonium hydroxide is then added in order to precipitate zirconia onto the hydrogel (not coprecipitated). The zirconia-silica mixture is washed, dried at 300° F., and calcined.

U.S. Pat. No. 2,444,913 discloses a method of preparing plural oxide catalysts containing zirconia and silica which comprises preparing a solution containing silica and zirconia by mixing an alkali metal silicate solution with an alkali metal zirconium carbonate solution and coprecipitating the silica and zirconia in said solution by the addition of an acid to a pH of about 6.5. The hydrogel is dried at 200°–210° F. and calcined at 1400° F. in an air-steam.

U.S. Pat. No. 3,950,316 discloses a method of preparing a silica-titania catalyst support comprising mixing a water soluble titanium compound (potassium titanium oxalate, $K_2TiO(C_2O_4)_2.2H_2O$ or ammonium titanium oxalate, $(NH_4)_2TiO(C_2O_4)_2.H_2O$ with an alkali metal silicate solution, said titanium compound being nonreactive with the silicate, adding an acidic material to the silicate cntaining the titanium compound to form a hydrogel, aging the hydrogel for more than one hour, washing the aged hydrogel with either an ammonium salt solution or a dilute acid to produce an alkali-free hydrogel, forming a mixture comprising said washed hydrogel and a normally liquid oxygen-containing water soluble organic azeotrope-forming compound, separating the organic compound with water to form a xerogel. In the present invention, in contrast, the zirconium oxalate is reactive with the silicate. For example, ammonia gas is liberated when ammonium zirconium oxalate is mixed with sodium silicate solution.

U.S. Pat. No. 3,862,104 is similar to the above U.S. Pat. No. 3,950,316 except potassium titanate oxalate in aqueous solution with sodium silicate is added to an ammonium sulfate solution.

U.S. Pat. No. 3,801,705 discloses a method for providing a silica xerogel having a narrow pore diameter distribution within the range 300–600Å, a surface area within the range 200–500 $m^2/g$, and a large pore volume between 2–3.5 cc/g.

None of the above discloses the claimed invention.

BRIEF DESCRIPTION OF THE DRAWING

FIG. 1 is a plot of the nitrogen pore volume verses the calcination temperature for Xerogels D and E.

DESCRIPTION OF THE PREFERRED EMBODIMENTS

In this invention an alkali metal or ammonium zirconium oxalate compound is used as the zirconia source during coprecipitation with silica from an alkali metal silicate in the presence of an acidic compound. These new catalyst supports have increased thermal stability towards high catalyst activation temperatures and produce resins with increased melt index when used as a polymerization catalyst support, especially with catalysts based on chromium (III) acetylacetonate particularly with this type of catalyst disclosed in prior U.S. Pat. No. 3,953,413, assigned to the assignee hereof.

The preparation of large pore volume zirconia-silica is by coprecipitating or copolymerizing hydrous zirconia and hydrous silica by dissolving or reacting a zirconium compound of the type $M_4Zr(C_2O_4)_4.nH_2O$, where M is an alkali metal or ammonium ion and n equals 0 to 10, with a silicon compound of the type $A_2SiO_3$, where A is an alkali metal, in aqueous solution at a pH of at least 11.0 followed by the addition of an acidic compound such as sulfuric acid, hydrochloric acid, or ammonium sulfate to a pH of about 5–9. The resulting hydrocogel is then aged at ambient to 90° C. for at least one hour followed by washing with water, aqueous ammonium nitrate, and again water. Water removal from the washed hydrocogel to produce the xerocogel is accomplished by azeotropic distillation with compounds capable of forming an azeotrope with water, for example, ethyl acetate or benzene, or by washing the hydrocogel with a water miscible solvent such as acetone. The final xerocogel is calcined at a temperature in the range of about 1000°–1800° F. prior to use as an olefin polymerization catalyst support. A xerocogel having a nitrogen pore volume in the range of about 1.5 to 3.5 cc/g, a surface area in the range of about 200–600 $m^2/g$. and a pore diameter in the range of about 200 Å to 600 Å is obtained. The concentration of zirconia ($ZrO_2$) in the xerocogel is in the range of about 0.1 to 67.5 weight percent, preferably about 1 to 5 weight percent.

It is desirable that both the zirconium compound and the alkali metal silicate be together in solution prior to cogel precipitation by strong acid. The pH of this solution determines whether premature precipitation of zirconia takes place completely or in part. If premature precipitation of zirconia takes place, it will obviously not be coprecipitated with silica and will therefore be lost by a necessary filtration step prior to coprecipitation by strong acid. Therefore, the pH of a solution of the zirconium compound and the alkali metal silicate should not drop below about 11.0 prior to the coprecipitation of zirconia and silica by strong acid.

The presence of oxalate anions insures or increases the solubility of the zirconium compound at a particular pH. For example, when a solution of zirconium sulfate (pH=2.0) was used in place of ammonium tetraoxalatozirconate and was added to a solution of sodium silicate (pH=11.6), substantial premature precipitation of hydrous zirconia took place even at a pH as high as 11.4. This necessitated removal by filtration, and therefore loss of zirconia, prior to strong acid promoted coprecipitation of what zirconium was left in solution. Thus, the targeted 2 wt. % zirconium in the final xerocogel was only 1.6 wt. %.

The preparation of the coprecipitated zirconia-silica and silica catalyst supports of this invention is illustrated by the following Examples A–E.

EXAMPLE A

Lithium Tetraoxalatozirconate (IV) Hydrate as the Zirconia Source

A solution of 15 grams of lithium tetraoxalatozirconate (IV) hydrate in 400 cc deionized water (pH=3.4) was added to a stirred solution of 400 grams of sodium silicate (% $Na_2O$, 6.75; % $SiO_2$, 25.3; wt. ratio $SiO_2$/$Na_2O$, 3.75) in 800 cc deionized water. The cloudy solution was then filtered. To the filtered solution, 12.75% sulfuric acid was added dropwise with stirring to a pH of 6. The coprecipitated hydrocogel was aged at about 90° C. for at least one hour during which time the pH was controlled at 6. The aged coprecipitated hydrocogel was then suction filtered and washed first with deionized water, a solution of 1% aqueous ammonium nitrate, and finally deionized water until sodium, lithium and sulfate ions were as completely removed as possible. Water was removed azeotropically with ethyl acetate. The recovered xerocogel was calcined at 1500° F. in air prior to use as a catalyst support (see Example 5 of the Table). Weight percent zirconium was 1.87, as zirconia 2.6 and nitrogen pore volume was 2.29 cc/g.

EXAMPLE B

Sodium Tetraoxalatozirconate (IV) Hydrate as the Zirconia Source

A solution of 66 grams of sodium tetraoxalatozirconate (IV) hydrate in 2400 cc deionized water (ph=4.5) was added to a stirred solution of 2400 grams sodium silicate (% $Na_2O$, 6.75; % $SiO_2$, 25.3; wt. ratio $SiO_2$/$Na_2O$, 3.75) in 4800 cc deionized water. Since an essentially clear solution was obtained, no filtration step was required. To the solution, initially at a pH of 11, was added 1800 cc of a 12.75% aqueous sulfuric acid solution dropwise with stirring. A pH of 6 was reached. The precipitated hydrocogel was then aged at about 90°0 C. for at least one hour, for example 10 hours. An additional 25 cc of 12.75% sulfuric acid was required to maintain the pH at 6. Following aging the hydrocogel was suction filtered and washed first with deionized water, a solution of 1% aqueous ammonium nitrate, and finally deionized water until sodium and sulfate ions were recovered. The bulk of the water was removed from the hydrocogel by acetone; the remaining water was removed azeotropically with a mixture of n-heptane and n-hexane. The recovered xerocogel was calcined at 1500° F. in air prior to use as a catalyst support (see Example 6 of the Table). Weight percent zirconium was 1.3, as zirconia 1.8 and nitrogen pore volume was 1.35 cc/g.

EXAMPLE C

Potassium Tetraoxalatozirconate (IV) Hydrate as the Zirconia Source

A solution of 111 grams potassium tetraoxalatozirconate (IV) hydrate in 2400 cc deionized water (pH=6.7) was added to a stirred solution of 2400 grams sodium silicate (% $Na_2O$, 6.75; % $SiO_2$, 25.3; wt. ratio $SiO_2$/$Na_2O$, 3.75) in 4800 cc deionized water. The resulting cloudy solution was filtered to remove small amounts of suspended solid. To the filtered solution, initially at a pH of 10.7 was added a total of 1680 cc of 12.75% sulfuric acid dropwise with stirring. Aging at a pH of about 6.0 was for at least one hour at 90° C., for example, 10 hours. The final pH was 6.3. Following aging the hydrocogel was suction filtered, washed with deionized water, 1% ammonium nitrate, and again deionized water. Water was removed from the hydrocogel azeotropically with ethyl acetate. The recovered xerocogel was calcined at 1500° F. in air prior to being used as a catalyst support (see Example 7 of the Table). Weight percent zirconium was 2.1 and a percent zirconia 2.8.

EXAMPLE D

Ammonium Tetraoxalatozirconate (IV) Pentahydrate as the Zirconia Source

A solution of 13 grams ammonium tetraoxalatozirconate (IV) pentahydrate in 400 cc deionized water (pH=3.5) was added at about 20° C. to a stirred solution of 400 grams sodium silicate (% $Na_2O$, 6.75; % $SiO_2$, 25.3; wt. ratio $SiO_2$/$Na_2O$, 3.75) in 800 cc deionized water. A slightly cloudy solution with a pH of 11.3 was obtained. Dilute sulfuric acid (12.75%) was then added until a pH of about 6 was reached. The resulting coprecipitate was then aged for at least one hour, for example 4 hours, at about 90° C. while maintaining the pH at 6.0 with additional dilute sulfuric acid. Following aging, the hydrocogel was collected by filtration and washed first with deionized water, a solution of 1% ammonium nitrate, and finally with deionized water. Water was removed azeotropically with ethyl acetate. The recovered xerocogel was air dried up to 80° C. to remove absorbed ethyl acetate. The xerocogel was separated into four 1 to 2 gram portions which were calcined for one hour at 300° F., 1500° F., 1700° F. and 1750° F., respectively. Each sample was then analyzed for nitrogen pore volume. Results are shown in FIG. 1. Comparison of pore volume data with that of the xerogel of Example E clearly shows that the tendency for pores to collapse with heating is reduced by the presence of zirconia with silica as a coprecipitate.

A larger portion of the recovered xerogel was calcined at 1500° F. in air prior to use as a catalyst support (see Example 8 of the Table). The nitrogen pore volume was 2.45 cc/gram.

Example E

No Zirconia

Dilute aqueous sulfuric acid (12.6) was added to a stirred solution of 200 grams sodium silicate (% $Na_2O$, 6.75; % $SiO_2$, 25.3; wt. ratio $SiO_2$/$Na_2O$, 3.75) in 500 cc deionized water (pH=11.6). When a pH of 6 was reached, the slurry was aged by heating at least one hour, for example, 2 hours, with stirring at about 90° C. while maintaining the pH at 6 by additional dilute sulfuric acid. After aging, the hydrogel was recovered by filtration and washed first with deionized water, a solution of 1% ammonium nitrate, and finally with deionized water in order to remove all soluble by-products. Water was removed azeotropically with ethyl acetate. The recovered xerogel was then air dried to remove absorbed ethyl acetate.

One to two gram samples of the xerogel were calcined for one hour at 300° F., 1500° F., 1700° F. and 1750° F., respectively. Each sample was then subjected to a nitrogen pore volume determination. Results are presented in FIG. 1. One can easily see the fall-off in pore volume with increased calcination temperature.

A larger portion of the recovered xerogel was calcined at 1500° F. in air prior to use as a catalyst support (see Example 4 of the Table). The nitrogen pore volume was 1.84 cc/gram.

Catalyst Preparation

The preparation of olefin polymerization catalysts having as a support the coprecipitated zirconia-silica is illustrated as follows:

Chromium (III) acetylacetonate type catalysts were prepared by dry mixing the chromium chelate with the calcined xerocogel (Examples 5, 6, 7 and 8 of of the Table). Heat activations were in a non-oxidizing atmosphere at 800°–2000° F., such as at 1700° F. in nitrogen, followed by a 30 minute dry air treatment at 1300° F. in a fluid bed. Chromium chelate catalysts based on a moderate pore volume silica (Example 2), on a moderate pore volume silica containing surface absorbed zirconia (Example 3) or on an initially high pore volume silica (Example 4) were prepared and activated in a similar fashion.

All catalysts contained 1 wt. % chromium.

The polymerization of olefins using the catalyst of this invention is illustrated by the polymerization of ethylene. A specific example of this is as follows:

Resin synthesis was in a one gallon autoclave with isobutane as diluent and under 550 psi pressure. Ethylene was fed on demand. synthesis conditions were at 225° F. (see Table).

The preparation of the catalysts using these supports and polymerization of ethylene to polyethylene are illustrated by the accompanying Table and can be summarized as follows:

Example 1

A commercial Phillips type chromium (VI) oxide catalyst based on a moderate pore volume (1.65 cc/gram), zirconia-free silica and activated in air at 1700° F. produced a polyethylene resin a 225° F. with a low milled melt index of 0.1.

EXAMPLE 2

A chromium (III) acetylacetonate type catalyst based on the same moderate pore volume, zirconia-free support as described in Example 1, activated at 1700° F. in nitrogen followed by air treatment at 1300° F. produced a polyethylene resin at 225° F. with an improved milled melt index of 0.4, still a relatively low value.

EXAMPLE 3

This example shows that a chromium (III) acetylacetonate catalyst based on the same moderate pore volume support as in Examples 1 and 2, but containing surface zirconia, showed no improvement in resin melt index.

EXAMPLE 4

The chromium (III) acetylacetonate type catalyst of this example was based on a high pore volume zirconia-free silica and demonstrates that although the pore volume was initially high, 2.30 cc/gram, the resin melt index was only 2.3 due to the collapse of unstabilized pores. Under the 1700° F. activation conditions of the catalyst, the pore volume was reduced to 1.64 cc/gram.

EXAMPLE 5

A chromium (III) acetylacetonate catalyst based on a high pore volume silica containing coprecipitated zirconia from lithium tetraoxalatozirconate (IV) hydrate, activated at 1700° F. followed by air treatment at 1300° F., produced a resin at 225° F. with a melt index almost double, 4.1, that from a resin derived from a zirconia-free catalyst (Example 4).

EXAMPLE 6

This chromium (III) acetylacetonate type catalyst was based on a moderately high pore volume silica containing coprecipitated zirconia from sodium tetraoxalatozirconate (IV) hydrate. This catalyst may be compared to that of Example 2, also a moderate pore volume catalyst. The resin melt index was 0.9, again higher than the melt index of a resin produced by a nearly equivalent catalyst without zirconia.

EXAMPLE 7

This chromium (III) acetylacetonate type catalyst was based on a moderate high pore volume silica containing coprecipitated zirconia from potassium tetraoxalatozironate (IV) hydrate. A review of the data again shows improved resin melt index.

EXAMPLE 8

A chromium (III) acetylacetonate type catalyst was based on a high pore volume silica containing coprecipitated zirconia from ammonium tetraoxalatozirconate (IV) hydrate. The resin melt index of 3.4 was in close agreement with the melt index of a resin produced from a similar catalyst based on silica containing coprecipitated zirconia from lithium tetraoxalatozicronate (IV) hydrate (Example 5).

The melt index of the polyethylene prepared with the catalysts of this invention is dependent upon the source of zirconia. This is a surprising result. For example, the melt indices increase in the following order where the zirconia source is as indicated:

$$Na_4Zr(C_2O_4)_4 < K_4Zr(C_2O_4)_4 < (NH_4)_4Zr(C_2O_4)_4 \approx Li_4Zr(C_2O_4)_4$$

TABLE

| Example No. | $ZrO_2$ Source[a] | Wt. % $ZrO_2$ | $N_2$[b] P.V., cc/g | Chromium Source | Activation, °F. $N_2$ | Activation, °F. Air | Resin[f] Synthesis Temp., °F. | Milled MI[c] |
|---|---|---|---|---|---|---|---|---|
| 1 | none | none | 1.65 | $CrO_3$ | — | 1700 | 225 | 0.1 |
| 2 | none | none | 1.65 | $Cr(AcAc)_3$[e] | 1700 | 1300 | 225 | 0.4 |
| 3 | $ZrO(NO_3)_2$[d] | 1.3 | 1.65 | $Cr(AcAc)_3$ | 1700 | 1300 | 225 | 0.4 |
| 4 | none | none | 1.84 | $Cr(AcAc)_3$ | 1700 | 1300 | 225 | 2.3 |
| 5 | LiZrOx | 2.6 | 2.29 | $Cr(AcAc)_3$ | 1700 | 1300 | 225 | 4.1 |
| 6 | NaZrOx | 1.8 | 1.35 | $Cr(AcAc)_3$ | 1700 | 1300 | 225 | 0.9 |
| 7 | KZrOx | 2.8 | — | $Cr(AcAc)_3$ | 1700 | 1300 | 225 | 1.3 |

TABLE-continued

| Example No. | ZrO₂ Source[a] | Wt. % ZrO₂ | N₂[b] P.V., cc/g | Chromium Source | Activation, °F. N₂ | Activation, °F. Air | Resin[f] Synthesis Temp., °F. | Milled MI[c] |
|---|---|---|---|---|---|---|---|---|
| 8 | NH₄ZrOx | 2.7 | 2.45 | Cr(AcAc)₃ | 1700 | 1300 | 225 | 3.4 |

Footnotes:
[a]Alkali metal or ammonium tetraoxalatozirconate(IV) hydrates, or zirconyl nitrate as indicated
[b]Pore volume of xerocogel after calcination at 1500° F. Catalysis, Vol. II, pp. 111-116, P. H. Rheinhold Publishing Corp., New York, N.Y., 1955.
[c]Milled resin melt index, grams per 10 minutes: ASTM D-1238-62T.
[d]Not coprecipitated but impregnated onto an existing silica xerogel followed by calcination to provide zirconia on silica.
[e]Chromium(III) acetylacetonate.
[f]Resin synthesis conditions were at the temperature indicated, in isobutane and under 550 psig total pressure.

All parts and percentages herein are by weight.

Having described our invention as related to the embodiments set out herein, it is our intention that the invention be not limited by any of the details of description, unless otherwise specified, but rather be construed broadly within its spirit and scope as set out in the appended claims.

We claim:

1. The method of preparing large pore volume zirconia-silica useful as a catalyst support for a catalyst for polymerizing and copolymerizing olefins, comprising:
   a. reacting a zirconium compound of the formula $M_4Zr(C_2O_4)_4 \cdot nH_2O$, where M is an alkali metal or ammonium ion and n equals 0 to 10, with a silicon compound of the type $A_2SiO_3$, where A is an alkali metal, in an aqueous solution at a pH of at least 11 and then adding an acidic material to a pH of about 5-9, to produce a hydrocogel;
   b. aging said hydrocogel at a temperature between about ambient to 90° C. for at least one hour;
   c. washing said hydrocogel of b first with water, then with aqueous ammonium nitrate and again with water;
   d. removing water from the resulting washed hydrocogel of c to produce a xerocogel by azeotropic distillation by mixing with a compound capable of forming an azeotrope with water or by washing the hydrocogel with a water miscible solvent to produce a substantially water-free, large pore volume zirconia-silica catalyst support; and
   e. calcining the resulting xerocogel at a temperature of about 1000°-1800° F. preparatory to its use as an olefin polymerization catalyst support.

2. the method of claim 1 wherein M is an alkali metal.

3. The method of claim 1 wherein M is an ammonium ion.

4. The method of claim 1 wherein said acidic compound in said aqueous solution is sulfuric acid, hydrochloric acid or ammonium sulfate.

5. The method of claim 1 wherein water is removed from the washed hydrocogel by azeotropic distillation with a compound capable of forming an azeotrope with water.

6. The method of claim 1 wherein water is removed by washing the hydrocogel with a water miscible solvent.

7. A catalyst support prepared by the method of claim 1.

8. A catalyst support prepared by the method of claim 2.

9. A catalyst support prepared by the method of claim 3.

10. A catalyst support prepared by the method of claim 4

11. A catalyst support prepared by the method of claim 5.

12. A catalyst support prepared by the method of claim 6.

* * * * *